UNITED STATES PATENT OFFICE.

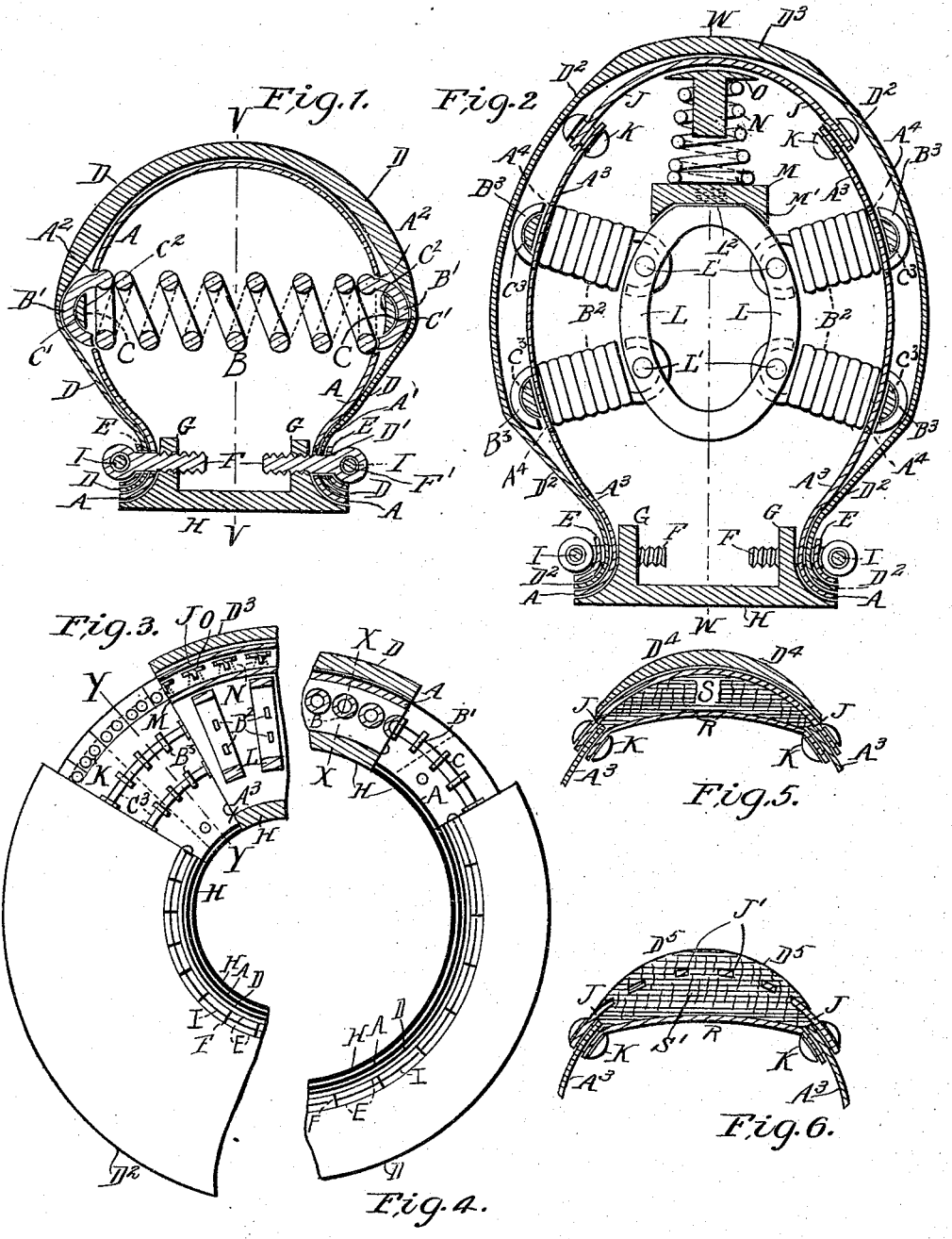

ELBERT F. DURFEE, OF ROSELLE PARK, NEW JERSEY.

RESILIENT OR CUSHION TIRE.

1,190,874.　　　　Specification of Letters Patent.　　Patented July 11, 1916.

Application filed July 16, 1915.　Serial No. 40,197.

*To all whom it may concern:*

Be it known that I, ELBERT F. DURFEE, a citizen of the United States, and a resident of Roselle Park, in Union county and State of New Jersey, have invented certain new and useful Improvements in Resilient or Cushion Tires, of which the following is a specification.

This invention relates to improvements in resilient or cushion tires, for use more especially with automobiles, motor vehicles, and the like, and has for its object to provide a tire of this character which will possess a high degree of resiliency and strength, thereby securing easier riding qualities and producing less wear on the vehicle.

It is also an object to provide a tire which will be free from punctures, blowouts, leakage and other such troublesome contingencies incident to the use of the present pneumatic form of tire, and which when the outer covering is worn or damaged may be readily replaced with a new outer covering, without necessitating the renewal of the entire tire, in this way materially decreasing the cost of upkeep of the vehicle, and adding immeasurably to the pleasure derived therefrom.

Together with the above advantages, it is a further object to produce a tire of this character which will be simple in construction and inexpensive to manufacture.

With these and other objects in view, my invention is shown in the accompanying drawing, and will be hereinafter more fully described and finally pointed out in the claims.

In the accompanying drawing, Figure I is a cross-section of one form of my improved tire taken on the line $x$—$x$ of Fig. IV, hereinafter referred to; Fig. II is a cross-section of a slightly modified form of construction, in which the general contour of the tire is elliptical, this view being taken on the line $y$—$y$ of Fig. III, hereinafter referred to; Fig. III is the form of my invention shown in Fig. II partly in section, and with parts broken away, the portion in section being taken on the line $w$—$w$ of Fig. II. Fig. IV is a similar view showing the first form of my improved tire partly in section and with parts broken away, the portion in section being taken on the line $v$—$v$ of Fig. I. Fig. V is a cross-sectional view of a modified form of tire tread; and Fig. VI is a cross-sectional view of a still further modified form of tire tread.

Similar reference characters indicate corresponding parts throughout the several figures of the drawing.

Referring to the drawing, and more particularly to Fig. I thereof, my improved tire comprises an inner flexible metallic sheath A substantially circular in cross-section and flared outwardly at its inner edges, said inner edges being provided with spaced apertures A' therein, through which screws F are inserted for securing the same to the peripheral flanges G of the rim H. At the sides of the said sheath, and connecting diametrically opposite points thereof, are provided a plurality of radially disposed elongated openings $A^2$, through which the turned-back hook-shaped ends B' of transverse helical springs B are secured by means of annular rings C passing between the said ends and the outer surface of the sheath A. The said rings C are provided with a flat or concave surface $C^2$, which engages the outer side of the sheath, and a rounded surface C', which engages the inner side of the said turned-back portions B' of the helical spring.

An outer covering D of rubber or the like, having a thickened tread surface, is secured over the sheath A and is held to the rim of the wheel by means of the screws F, holes or openings D' being provided in the said covering and sheath through which the said screws pass. The outer cover D is held in place over the sheath A by means of an annular ring E, which is held in place by the enlarged screw-eyes F' of the screws F. An annular locking-ring I is passed through the said screw-eyes of the screws F for securing the same in position and preventing turning or loosening thereof.

The above described construction is particularly adapted to tires of circular cross-section, but in Fig. II, I have shown a slight modification of my invention as embodied in a tire of elliptical shape. In this form of construction, a flexible metallic sheath comprising side-pieces $A^3$ arcuate in cross-section and flared outwardly at the inner edges, is secured to the rim of the wheel, in a similar manner as that described with reference to Fig. I, and a flexible metallic tread portion J is secured to the outer edges thereof by means of the rivets K, the said tread portion being slightly thicker than the side-pieces A³. Instead of the simple spring B employed in the first form of construction, I provide in this form a plurality of radial helical springs B², elongated openings A⁴ being provided in the side-pieces A³, through which the outer turned-back ends B³ of the springs pass and are secured by annular rings C³ similar in shape to the rings C.

Elliptical cores or radially disposed rings L are provided within the tire, to which the inner ends of the helical springs B² are secured by means of cross-pins L′. The outer surface of the said rings L is flattened, as at L², and supported thereon is an inner annular ring M provided with the overhanging flanges M′, which engage the sides of the said ring L to prevent transverse movement thereof with respect to the ring M. Supported on the said ring M are a plurality of spiral springs N, in the outer ends of which are disposed the mushroom heads O, which engage and press against the inner side of the tread portion J of the sheath of the tire. An outer cover or shoe D² is secured over the said sheath, and is provided with a thickened portion D³, the inner edges of the said cover being secured to the rim of the wheel in a similar manner as that described with reference to Fig. I.

In Fig. V is shown a modified form of tread, in which a resilient reinforcing inner filling S is provided beneath the tread portion J of the sheath of the tire and the outer tread portion D⁴, and this is held in place by means of an annular supporting member R, the rivets K, which secure the tread J to the side-pieces A³, also serving to secure the member R to the said side-pieces.

The construction shown in Fig. VI is somewhat similar to that described with reference to Fig. V, with the exception that the tread portion J of the sheath is perforated, as at J′, so that the tread D⁵ of the tire and the inner reinforcing portion S′ are formed integral with each other, said tread portion J being in the nature of a reinforcing member for this solid tread portion D⁵ and the reinforcing portion S′.

From the foregoing description, it will be seen that when any section of the tire is in contact with the ground or roadway, the tread of the tire is forced toward the rim H of the wheel by the weight imposed upon the wheel, so that the sides of the tire are distended outwardly against the tension of the springs B, in the form shown in Fig. I, and the tension of springs B², in the form shown in Fig. II, the springs N, in the form shown in Fig. II, being at the same time compressed by means of the mushroom heads O. This movement or change of form in the sheath is checked and gradually overcome by the resisting strength of the flexible material, of which the sheath is constructed, aided by the tensile strength of the springs B and B² in the two forms disclosed, and the compressive strength of the springs N in the form shown in Fig. II. These springs, it will be seen, are strained as soon as the form of the sheath is altered—the greater the change in the form of the same, the greater is the resistance created by the springs to overcome it. Also it will be seen that during this movement, all the stresses will not be concentrated in the immediate transverse section of the tire, which is in contact with the ground, these stresses and change in form of the sheath being distributed and taken up by adjoining sections by means of the annular rings C and C³, which are of sufficient rigidity for this purpose, and also the annular ring M shown in Fig. II distributes the stress upon the springs N, which are in contact with the ground, to the adjoining springs N. As the wheel revolves, the portions of the tire, after being in contact with the ground, resume their normal shape or form. The radially disposed annular rings L, aside from their utility as a supporting means for the springs N and the connecting means for the springs B², will also serve as a substantial support for the tire in the event that any undue weight be placed thereon and the tire flattened beyond the normal sustaining qualities of the springs, such for instance as might be the case in the use of these tires with large commercial trucks or the like.

Among the advantages of my improved tires, besides freedom from punctures, blowouts and the like, the use of a standard foundation for the tire is made possible, the metallic sheath as disclosed herein being composed of members of known qualities and capacities for work, so that a better standard may be maintained with the tires, and the user will be assured that the same will come up to all the requirements. Also, by means of the use of an outside covering, which may be readily removed when worn out, the upkeep of the tire will be materially reduced, as it will be only necessary, when the outer covering is worn out, to purchase a new outer covering, the flexible metallic sheath and springs being because of their non-destructibility a permanent part of the machine, and forming in effect a fixed portion of the wheels themselves. My improved tire will also prove more resilient than the pneumatic tires at present in use, and will provide easier riding qualities in the vehicle. It will be understood that if the metallic sheath is made of one continuous seamless piece of tubing, it is necessary that the covering or shoe must be fitted around the sheath with a lapped joint, while on the other hand, if the cover or shoe is one continuous seamless piece, it is necessary that the sheath be fitted into the cover or shoe in sections or by means of a slanting butt-joint.

I have illustrated preferred and satisfactory forms of my invention, but it is obvious that changes may be made therein within the spirit and scope thereof, for instance, the shape, size and strength of the sheath and its component parts and methods of attachment of the completed tire to the wheel may be changed, and other modifications resorted to, so that I do not desire to be limited to the particular form described and illustrated, except as may be required by the claims.

I claim:—

1. A cushion tire of the character described, comprising a flexible metallic sheath, having a continuous unbroken tread portion, transverse spring means therein, connecting opposite points, and annular means disposed on said sheath connecting the said spring means, and adapted to distribute stresses upon one portion of the tire to adjacent portions thereof.

2. A cushion tire of the character described, comprising a flexible metallic sheath, having a continuous unbroken tread portion, transverse spring means therein, connecting opposite points, and annular means disposed on said sheath connecting the ends of said spring means, having sliding engagement therewith, and adapted to distribute stresses upon one portion of the tire to adjacent portions thereof.

3. A cushion tire of the character described, comprising a flexible metallic sheath, having a continuous unbroken tread portion, transverse spring means therein connecting opposite points, and annular means disposed on said sheath connecting the ends of the said transverse spring means, and adapted to distribute stresses upon one portion of the said tire to adjacent portions thereof, and an outer covering extending over the said sheath and said annular means.

4. A cushion tire of the character described, comprising a flexible metallic sheath, having a continuous unbroken tread portion, a plurality of radially disposed rings within the said sheath, transverse spring means secured between the said rings and the sides of the said sheath, annular means exterior of the said sheath connecting the ends of the said transverse spring means, having sliding engagement therewith, and adapted to distribute stresses upon one portion of the said tire to adjacent portions thereof, and an outer covering extending over the said sheath and said annular means.

5. A cushion tire of the character described, comprising a flexible metallic sheath, a plurality of radially disposed rings within the said sheath, an annular ring supported by the said plurality of radially disposed rings, transverse spring means secured between the said plurality of rings and the sides of the sheath, spring means disposed between the said annular ring and the tread of the sheath, annular means exterior of the said sheath connecting the ends of the said transverse spring means, the said annular ring and the said annular connecting means adapted to distribute stresses upon one portion of the said tire to adjacent portions thereof.

6. The combination with the rim of a vehicle wheel, having annular flanges at each side thereof, of a cushion tire comprising a flexible metallic sheath, having a continuous unbroken tread portion and sides, the said sides engaging at their edges the said flanges, transverse spring means therein connecting opposite points, annular means disposed on said sheath connecting the ends of the said transverse spring means, having sliding engagement therewith, and adapted to distribute stresses upon one portion thereof to adjacent portions, an outer covering extending over the said sheath, and annular means and coinciding at its edges with the edges of the said sheath, annular rings disposed over the edges of the said sheath and covering, and means passing through the said annular rings, outer covering and inner sheath securing the same to the flanges of the said rim.

In testimony that I claim the foregoing as my invention, I have signed my name in presence of two subscribing witnesses.

ELBERT F. DURFEE.

Witnesses:
D. LEWIS MATTERN,
JOS. BISBANO.

Copies of this patent may be obtained for five cents each, by addressing the "Commissioner of Patents, Washington, D. C."